United States Patent
Fuke

(10) Patent No.: US 12,430,972 B2
(45) Date of Patent: Sep. 30, 2025

(54) VEHICLE, JUDGING METHOD, AND NON-TRANSITORY, COMPUTER-READABLE RECORDING MEDIUM ON WHICH COMPUTER PROGRAM IS RECORDED

(71) Applicant: TOYOTA JIDOSHA KABUSHIKI KAISHA, Toyota (JP)

(72) Inventor: Jumpei Fuke, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/605,465

(22) Filed: Mar. 14, 2024

(65) Prior Publication Data

US 2024/0221444 A1    Jul. 4, 2024

Related U.S. Application Data

(63) Continuation of application No. 17/940,285, filed on Sep. 8, 2022, now Pat. No. 11,961,351.

(30) Foreign Application Priority Data

Sep. 27, 2021  (JP) .................................. 2021-156492

(51) Int. Cl.
  *G07C 9/25* (2020.01)
  *G07C 9/00* (2020.01)
  *H04W 76/18* (2018.01)

(52) U.S. Cl.
  CPC .......... *G07C 9/25* (2020.01); *G07C 9/00309* (2013.01); *H04W 76/18* (2018.02)

(58) Field of Classification Search
  None
  See application file for complete search history.

(56) References Cited

U.S. PATENT DOCUMENTS

| | | | |
|---|---|---|---|
| 7,061,368 B2 * | 6/2006 | Okada | B60R 25/24 340/5.6 |
| 7,271,718 B2 * | 9/2007 | Jedlicka | G08B 13/1427 340/572.1 |
| 8,768,565 B2 * | 7/2014 | Jefferies | G07C 5/0808 701/32.7 |
| 8,811,948 B2 * | 8/2014 | Bandyopadhyay | H04L 63/0861 345/173 |
| 9,378,343 B1 * | 6/2016 | David | H04W 12/08 |

(Continued)

FOREIGN PATENT DOCUMENTS

| | | | | |
|---|---|---|---|---|
| CN | 101188027 A | * | 5/2008 | ............ B60R 25/04 |
| JP | 2005-262915 A | | 9/2005 | |

(Continued)

*Primary Examiner* — Carlos Garcia
(74) *Attorney, Agent, or Firm* — Oblon, McClelland, Maier & Neustadt, L.L.P.

(57) ABSTRACT

A vehicle includes a memory and a processor coupled to the memory. The processor is configured to determine whether or not a communication interface is malfunctioning, the communication interface being configured to perform communication for confirming that a device, which holds a digital key for activation, is inside a vehicle cabin, and in a case in which it is determined that the communication interface is malfunctioning, perform processing that enables activation based on a result of authentication of the device.

5 Claims, 7 Drawing Sheets

(56) References Cited

U.S. PATENT DOCUMENTS

| | | | |
|---|---|---|---|
| 10,000,135 B2 * | 6/2018 | Yoshida | B62D 15/0285 |
| 10,000,285 B2 * | 6/2018 | Shannon | B66D 1/12 |
| 2003/0046083 A1 * | 3/2003 | Devinney, Jr. | G06Q 20/00 |
| | | | 704/273 |
| 2003/0117295 A1 * | 6/2003 | Okada | B60R 25/24 |
| | | | 340/12.23 |
| 2006/0232398 A1 * | 10/2006 | Nedblake | G08B 13/1427 |
| | | | 340/10.51 |
| 2006/0267762 A1 * | 11/2006 | Jedlicka | G08B 21/0275 |
| | | | 340/572.1 |
| 2008/0119217 A1 * | 5/2008 | Coxhill | H04M 1/67 |
| | | | 455/550.1 |
| 2009/0010502 A1 | 1/2009 | Hackbarth | |
| 2010/0077465 A1 * | 3/2010 | Chou | G06F 21/31 |
| | | | 714/48 |
| 2011/0035632 A1 | 2/2011 | Hong | |
| 2013/0237174 A1 * | 9/2013 | Gusikhin | H04W 4/90 |
| | | | 455/404.1 |
| 2016/0306350 A1 | 10/2016 | Shim et al. | |
| 2016/0338136 A1 * | 11/2016 | Zhang | H04W 74/0833 |
| 2019/0001925 A1 * | 1/2019 | Arakawa | B60W 40/08 |
| 2020/0084584 A1 * | 3/2020 | Yamaguchi | H04B 1/3822 |
| 2020/0127986 A1 * | 4/2020 | Fujiwara | B60R 25/2018 |
| 2020/0148168 A1 * | 5/2020 | DeLong | B60R 25/24 |
| 2020/0287746 A1 | 9/2020 | Kotani | |
| 2021/0044594 A1 * | 2/2021 | Tamura | H04L 63/102 |
| 2021/0206350 A1 | 7/2021 | Henderson | |
| 2022/0017043 A1 * | 1/2022 | Breynaert | G01S 13/581 |
| 2023/0076147 A1 * | 3/2023 | Liu | H04W 12/106 |
| 2023/0135506 A1 * | 5/2023 | Oh | G07C 9/00309 |
| | | | 340/5.52 |
| 2024/0221444 A1 * | 7/2024 | Fuke | B60R 25/25 |

FOREIGN PATENT DOCUMENTS

| | | |
|---|---|---|
| JP | 2006-273026 A | 10/2006 |
| JP | 2015-193987 A | 11/2015 |
| KR | 10-2020-0120809 A | 10/2020 |

* cited by examiner

VEHICLE, JUDGING METHOD, AND NON-TRANSITORY, COMPUTER-READABLE RECORDING MEDIUM ON WHICH COMPUTER PROGRAM IS RECORDED

CROSS-REFERENCE TO RELATED APPLICATION

This application is a Continuation of U.S. patent application Ser. No. 17/940,285, filed on Sep. 8, 2022, which is based on and claims priority under 35 USC 119 from Japanese Patent Application No. 2021-156492 filed on Sep. 27, 2021, the disclosure of which is incorporated by reference herein.

BACKGROUND

Technical Field

The present disclosure relates to a vehicle, a judging method, and a non-transitory, computer-readable recording medium on which a computer program is recorded.

Related Art

There is disclosed a technique in which, in a digital key system that can start a vehicle by carrying out authentication with a portable device that is within the vehicle cabin at the time an engine switch is operated, it is confirmed that a digital key exists within the vehicle, and the vehicle is started. Japanese Patent Application Laid-Open (JP-A) No. 2005-262915 discloses a technique in which, on the basis of the absence/presence of a signal transmitted from a portable device that responds to an output signal from an in-cabin sensing means provided in the vehicle, it is sensed whether or not the portable device is within the vehicle cabin. If it is sensed that the portable device is within the vehicle cabin, operation of predetermined control equipment is permitted.

However, there the problem that, if there is trouble with the communicating means such as the antenna or the like that is for confirming that a digital key exists within the vehicle, it cannot be confirmed whether or not the digital key exists within the vehicle, and it is not possible to start the vehicle using the digital key.

SUMMARY

An aspect of the disclosure is a vehicle which includes a memory, and a processor coupled to the memory. The processor is configured to determine whether or not a communication interface is malfunctioning, the communication interface being configured to perform communication for confirming that a device, which holds a digital key for activation, is inside a vehicle cabin, and in a case in which it is determined that the communication interface is malfunctioning, perform processing that enables activation based on a result of authentication of the device.

BRIEF DESCRIPTION OF THE DRAWINGS

Exemplary embodiments of the present disclosure will be described in detail based on the following figures, wherein.

DETAILED DESCRIPTION

Figure 1:
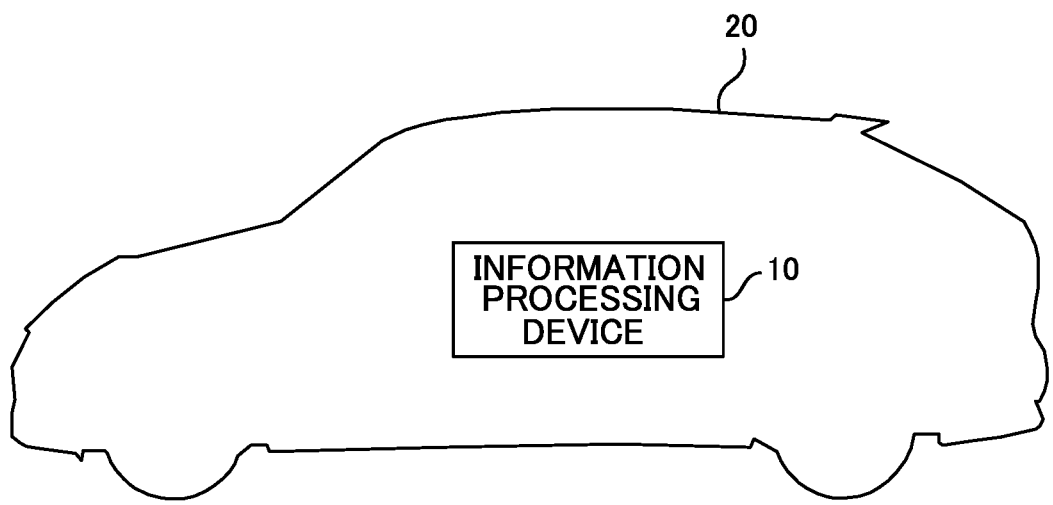
FIG. 1 is a drawing illustrating an example of the schematic structure of a vehicle control system relating to an embodiment.

Examples of embodiments of the present disclosure are described hereinafter with reference to the drawings. Note that structural elements and portions that are the same or equivalent are denoted by the same reference numerals in the respective drawings. Further, there are cases in which the dimensional proportions in the drawings are exaggerated for convenience of explanation, and they may differ from actual proportions.

(System Structure)

FIG. 1 is a drawing illustrating an example of the schematic structure of a vehicle control system relating to an embodiment of the present disclosure. A vehicle control system 1 illustrated in FIG. 1 is structured to include an information processing device (holder) 10 and a vehicle 20.

The information processing device 10 is a mobile terminal such as a smart phone or the like for example, and is a device that can function as a digital key for unlocking the doors of the vehicle 20 and starting the engine. The information processing device 10 can be used as a digital key of the vehicle 20 due to an application for functioning as a digital key being downloaded and installed. In the present embodiment, the information processing device 10 being able to be used as a digital key of the vehicle means a state in which the information processing device 10 is in a state of holding key information of the vehicle 20.

The vehicle 20 relating to the present embodiment carries out near field communication with the information processing device 10 that functions as a digital key of the vehicle 20, and executes processings relating to the digital key. In the present embodiment, the information processing device 10 and the vehicle 20 carry out wireless communication that is based on BLE (Bluetooth® Low Energy) standards that serve as near field communication standards. As a processing relating to a digital key, the vehicle 20 executes processing that starts the engine on the basis of an engine start request from the information processing device 10 that operates as a digital key of the vehicle 20.

When the vehicle 20 receives an engine start request from the information processing device 10, the vehicle 20 judges whether or not the information processing device 10 exists within the cabin of the vehicle 20. The reason for judging whether or not the information processing device 10 exists within the cabin of the vehicle 20 is in order to prevent starting of the engine in a state in which the information processing device 10 is outside of the vehicle cabin. The vehicle 20 judges whether or not the information processing device 10 is within the cabin of the vehicle 20 by referring to the strength of the radio waves that are emitted from the information processing device 10 and received by an antenna provided within the vehicle cabin.

However, if there is only one antenna that is provided within the vehicle cabin, and the strength of the radio waves cannot be referenced for a reason such as there is trouble with that antenna or the like, the vehicle 20 cannot judge whether or not the information processing device 10 exists within the vehicle cabin, and, even if the information processing device 10 does exist within the cabin of the vehicle 20, starting of the engine in accordance with an engine start request from the information processing device 10 cannot be carried out. If plural antennas for judging whether or not the information processing device 10 exists within the vehicle cabin are provided, even though judgment can be carried out by using another antenna if there is trouble with one antenna, this leads to an increase in costs.

Thus, in a case in which the vehicle 20 relating to the present embodiment cannot refer to the strength of the radio waves emitted by the information processing device 10 for a reason such as there is trouble with an antenna provided within the vehicle cabin or the like, the vehicle 20 requests that user authentication be carried out at the information processing device 10. After user authentication at the information processing device 10 is completed, the vehicle 20 relating to the present embodiment newly receives an engine start request from the information processing device 10, and starts the engine in accordance with the engine start request.

Due to the vehicle 20 relating to the present embodiment using the results of authentication carried out at a device that functions as a digital key, starting by using the digital key is possible even in cases in which is cannot be confirmed whether or not the digital key exists within the vehicle cabin.

(Structure)
(Information Processing Device)

Figure 2:
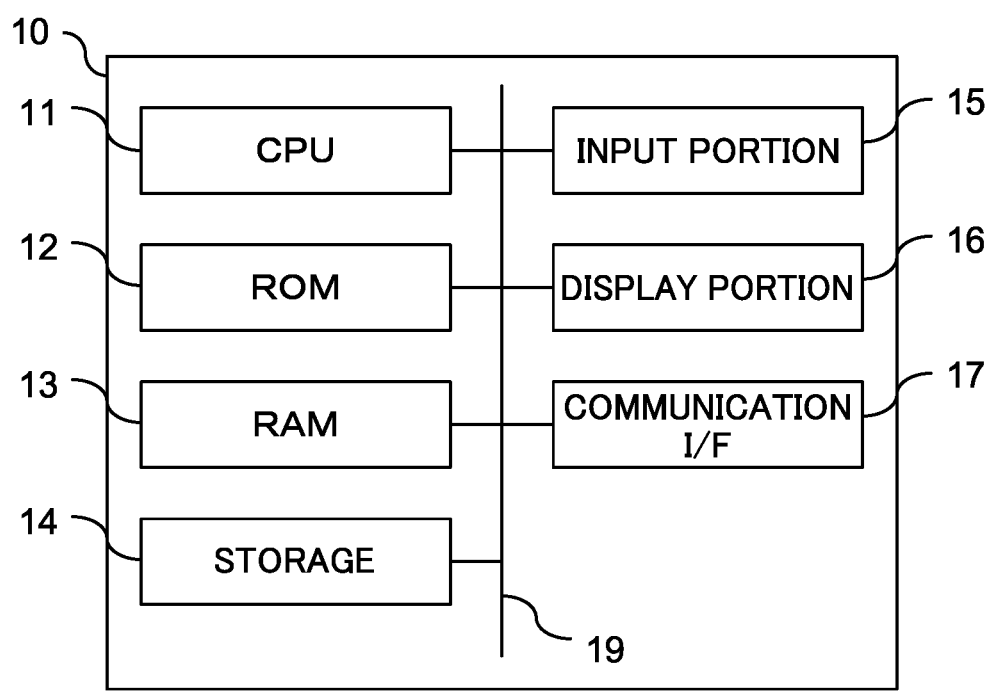
FIG. 2 is a block drawing illustrating an example of hardware structures of an information processing device.

FIG. 2 is a block drawing illustrating an example of hardware structures of the information processing device 10.

As illustrating in FIG. 2, the information processing device 10 has a CPU (Central Processing Unit) 11, a ROM (Read Only Memory) 12, a RAM (Random Access Memory) 13, a storage 14, an input portion 15, a display portion 16 and a communication interface (I/F) 17. These respective structures are connected so as to be able to communicate with one another via a bus 19.

The CPU 11 that is an example of a hardware processor is a central computing processing unit, and executes various programs and controls the respective sections. Namely, the CPU 11 reads-out a computer program from the ROM 12 or the storage 14, and executes the program by using the RAM 13, which is an example of the memory, as a workspace. The CPU 11 caries out control of the above-described respective structures, and various computing processings, in accordance with computer programs that are recorded in the ROM 12 or the storage 14. In the present embodiment, a computer program for functioning as a digital key of the vehicle 20 is stored in the ROM 12 or the storage 14.

The ROM 12 stores various programs and various data. The RAM 13 temporarily stores programs and data as a workspace. The storage 14 is structured by a storage device such as an HDD (Hard Disk Drive), an SSD (Solid State Drive), a flash memory or the like that is an example of a non-transitory recording medium, and stores various programs, including the operating system, and various data.

The input portion 15 includes a pointing device such as a mouse or the like, and a keyboard, and is used in order to carry out various types of input.

The display portion 16 is a liquid crystal display for example, and displays various information. The display portion 16 may function as the input portion 15 by employing a touch panel form therefor.

The communication interface 17 is an interface for communicating with other equipment such as the vehicle 20 and the like, and uses standards such as, for example, Ethernet®, FDDI, Wi-Fi®, BLE or the like.

(Vehicle)

Figure 3:
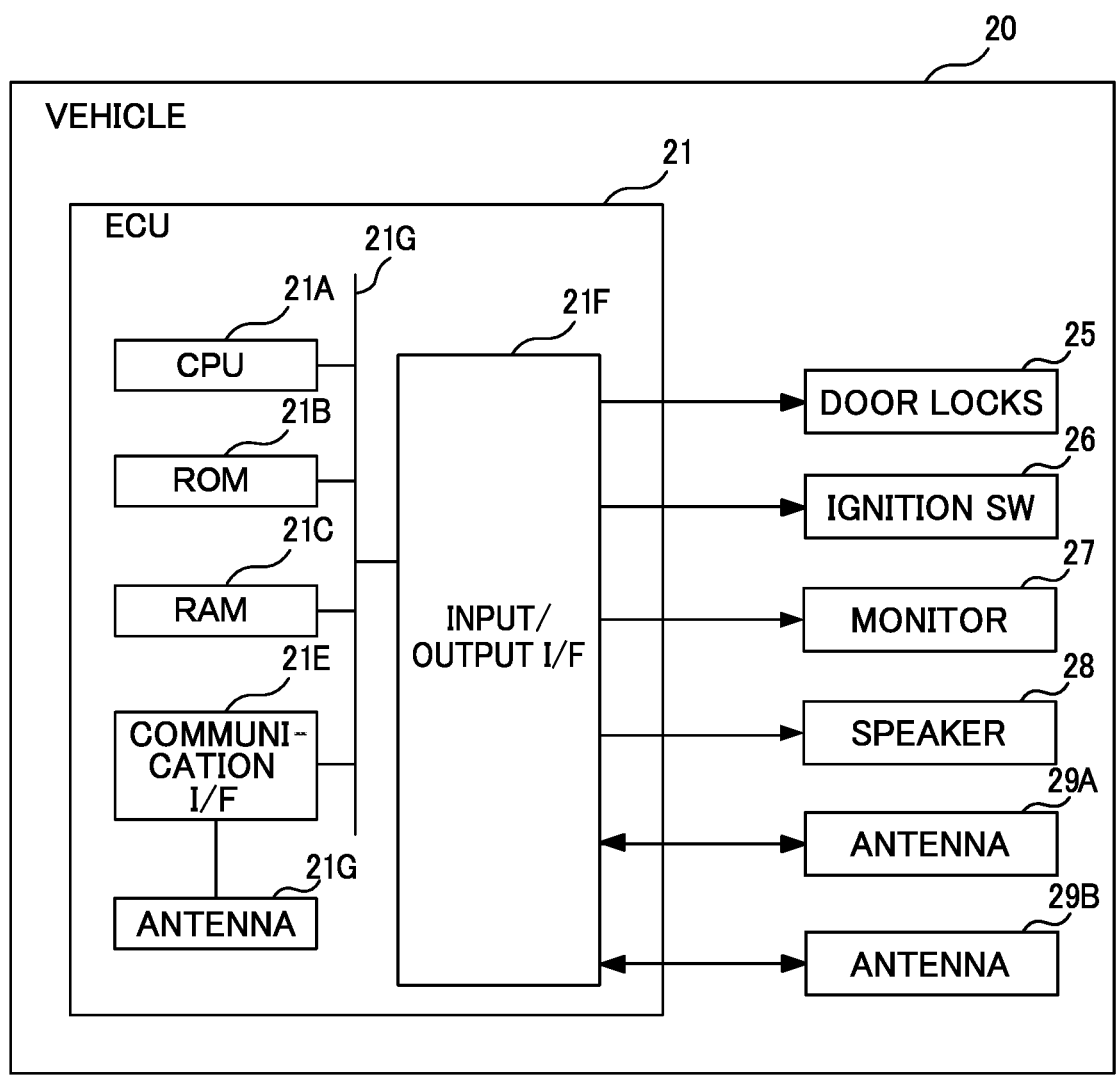
FIG. 3 is a drawing illustrating a hardware structure example of a vehicle.

FIG. 3 is a drawing illustrating a hardware structure example of the vehicle 20. As illustrated in FIG. 3, the vehicle 20 relating to the present embodiment is structured to include an ECU 21. The vehicle 20 is structured so as to further include door locks 25, an ignition switch (SW) 26, a monitor 27, a speaker 28, and antennas 29A, 29B.

The ECU 21 is structured to include a CPU (Central Processing Unit) 21A, a ROM (Read Only Memory) 21B, a RAM (Random Access Memory) 21C, a wireless communication I/F (Inter Face) 21E, an input/output I/F 21F, and an antenna 21G. The CPU 21A, the ROM 21B, the RAM 21C, the wireless communication I/F 21E and the input/output I/F 21F are connected so as to be able to communicate with one another through an internal bus 21H.

The CPU 21A that is an example of a hardware processor is a central computing processing unit, and executes various programs and controls the respective sections. Namely, the CPU 21A reads-out a program from the ROM 21B that is an example of a non-transitory recording medium, and executes the program by using the RAM 21C, which is an example of the memory, as a workspace.

The ROM 21B stores various programs and various data. A computer program for controlling the ECU 21 is stored in the ROM 21B of the present embodiment.

The RAM 21C temporarily stores programs and data as a workspace.

The wireless communication I/F 21E is a wireless communication module for communicating with the information processing device 10. BLE communication standards are used at the wireless communication module. The wireless communication I/F 21E is connected to the antenna 21G.

The input/output I/F 21F is an interface for communicating with the door locks 25, the ignition switch SW 26, the monitor 27, the speaker 28 and the antennas 29A, 29B that are installed in the vehicle 20.

The antenna 21G is an antenna that transmits and receives wireless communication packets in accordance with BLE, to and from the information processing device 10.

The door locks 25 are locks of the doors of the vehicle 20. In addition to the door locks 25 being locked and unlocked by users riding in the vehicle 20, the locking and unlocking is controlled by the CPU 21A.

The ignition SW 26 is a switch that starts the engine of the vehicle 20. In addition to the ignition SW 26 being turned on and off by a user riding in the vehicle 20, the turning on and off of the ignition SW 26 is controlled by the CPU 21A.

The monitor 27 is provided at the instrument panel, the meter panel or the like, and is a liquid crystal monitor for displaying images relating to the destination, the traveling route, and warning information. A touch panel, which also functions as a switch for the inputting of operations by fingers of vehicle occupants, may be provided at the monitor 27.

The speaker 28 is provided at the instrument panel, the center console, the front pillar, the dashboard or the like, and is a device that outputs sound.

The antenna 29A is an example of the communication section of the present disclosure, and is an antenna for measuring the radio wave strength of the BLE packet emitted by the information processing device 10. The antenna 21G of the ECU 21 is used in wireless communication with the information processing device 10, whereas the antennas 29A, 29B are used in order to measure the radio wave strength of the BLE packet emitted from the information processing device 10. The one antenna 29A is provided within the cabin of the vehicle 20. The CPU 21A judges whether or not the information processing device 10 is within the cabin of the vehicle 20, by using the strength of the radio waves received by the antenna 29A. Further, a plurality of the antennas 29B are provided in the vehicle 20. The CPU 21A computes the distance between the information processing device 10 and the vehicle 20 by using the intensities of the radio waves received by the antennas 29B. The antennas 29B can be provided, for example, at the front portion, a left side surface portion, and a right side surface portion of the vehicle 20.

In FIG. 3, the one ECU 21 is the structure that controls the respective devices of the vehicle 20. However, the present disclosure is not limited to this example. For example, the ECU that controls the door locks 25 and the ECU that controls the ignition SW 26 may be separate ECUs.

The functional structures realized by the vehicle 20 are described next.

Figure 4:
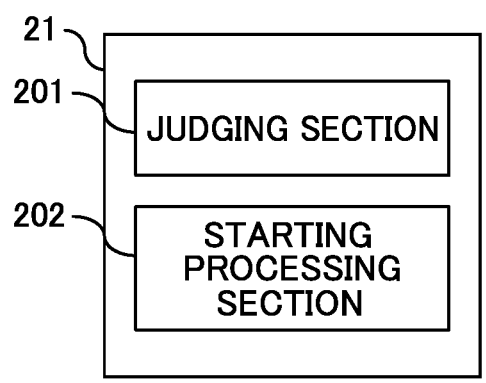
FIG. 4 is a drawing illustrating a functional structure example of the vehicle.

FIG. 4 is a block drawing illustrating an example of the functional structures of the vehicle 20.

As illustrated in FIG. 4, the vehicle 20 has, as the functional structures thereof, a judging section 201 and a starting processing section 202. These respective functional structures are realized by the CPU 21A reading-out a computer program that is stored in the ROM 21B, and executing the computer program.

The judging section 201 judges whether or not there is trouble with the antenna 29A that carries out communication for confirming that the information processing device 10, which holds the key for starting, is within the vehicle cabin. In further detail, the judging section 201 communicates periodically with the antenna 29A. Further, the judging section 201 judges that there is trouble with the antenna 29A due to replies from the antenna 29A being interrupted. Note that, it cannot be discriminated that there has been an error merely by interruption of a single time, and therefore, the judging section 201 may judge that there is trouble with the antenna 29A due to interruption of a predetermined number of times.

The starting processing section 202 carries out control that starts the engine of the vehicle 20 by controlling the ignition SW 26. In the present embodiment, whether or not to control the ignition SW 26 is determined in accordance with the results of judgment of the judging section 201. If the judging section 201 judges that there is trouble with the antenna 29A, the starting processing section 202 carries out processing that makes starting possible on the basis of the results of authentication that is carried out at the information processing device 10. Examples of the authentication carried out at the information processing device 10 are passcode authentication, pattern authentication, fingerprint authentication, face authentication, and other forms of biometric authentication. By using biometric authentication as the authentication at the information processing device 10, starting of the vehicle 20 by using the digital key become possible upon ensuring that that party who issued the start request from the information processing device 10 that has the digital key is the user of the information processing device 10. Note that, in a case in which the judging section 201 does not judge that there is trouble with the antenna 29A, the starting processing section 202 carries out processing that makes starting possible, without using results of authentication carried out at the information processing device 10.

In a case in which the judging section 201 judges that there is trouble with the antenna 29A, the starting processing section 202 may, on the basis of the results of authentication carried out at the information processing device 10, carry out processing that makes starting possible only within a predetermined time. The predetermined time is made to be around 30 seconds for example. Further, in a case in which the starting processing section 202 makes starting possible only within a predetermined time on the basis of the results of authentication at the information processing device 10, the starting processing section 202 may change the aforementioned predetermined time in accordance with the method of authentication that is used. For example, the starting processing section 202 may change the predetermined time in accordance with the strength of the authentication method. In detail, for example, the starting processing section 202 may make the time in a case in which biometric authentication is used as the authentication method longer than the time in a case in which passcode authentication or pattern authentication is used as the authentication method. Due to the starting processing section 202 making starting possible only during the time that has been set in accordance with the authentication method, security corresponding to the authentication method that is carried out at the information processing device 10 can be provided.

The user may select the authentication method that is used in the authenticating at the information processing device 10. Or, the starting processing section 202 may designate the authentication method that is used in the authenticating at the information processing device 10. Or, the authentication method may be the same as or different than the authentication method that is used in order to unlock the information processing device 10.

Due to the vehicle 20 having these structures, by using the results of authentication that is carried out at the information processing device 10 that functions as a digital key, starting by using the digital key is possible even in cases in which it cannot be confirmed whether or not the digital key exists within the vehicle.

Operation

Operations of the information processing device 10 and the vehicle 20 are described next.

Figure 5:
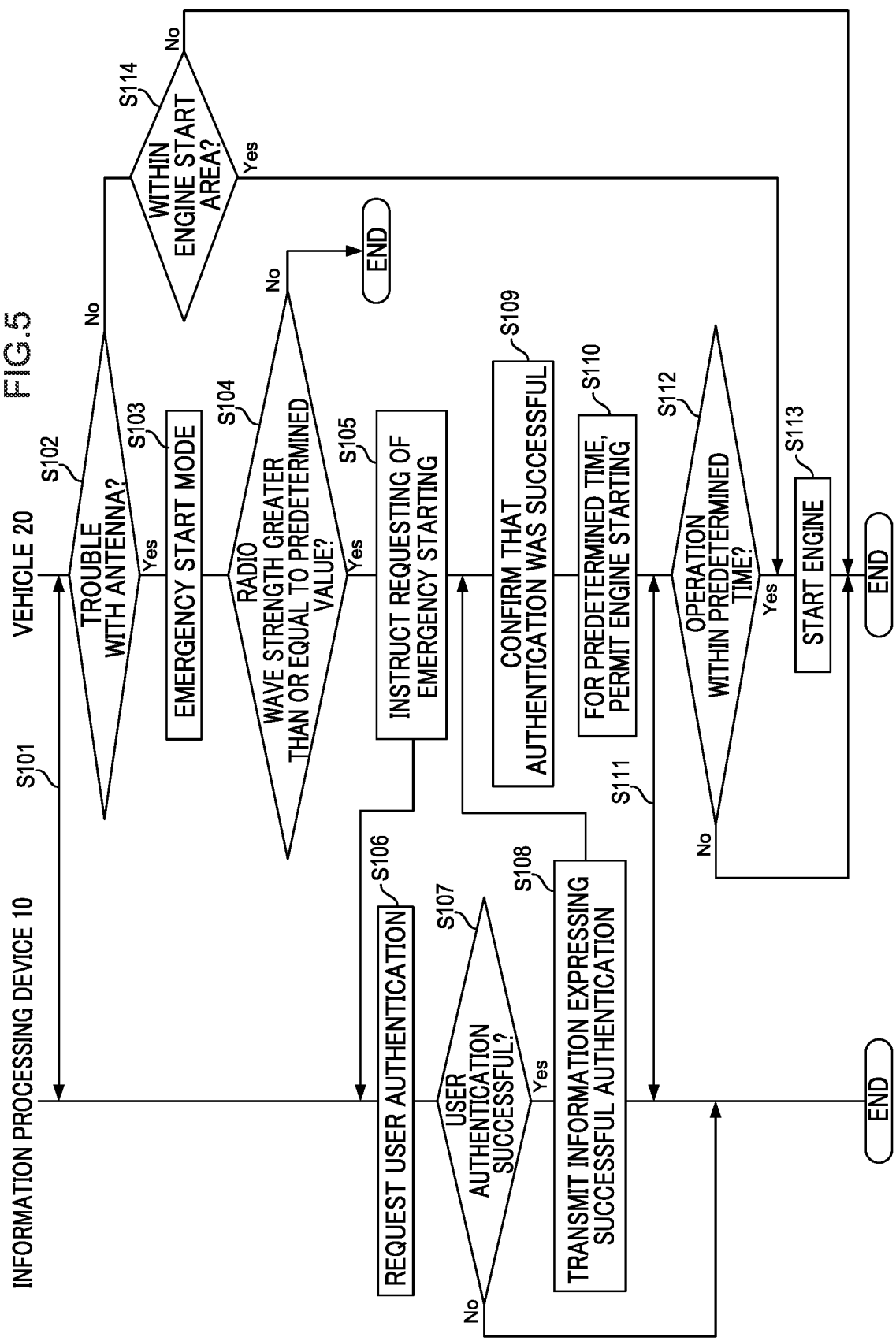
FIG. 5 is a sequence drawing illustrating an example of the flow of engine starting processing of the vehicle, which is executed by the information processing device and the vehicle.

FIG. 5 is a sequence drawing illustrating an example of the flow of engine starting processing of the vehicle 20 that is executed by the information processing device 10 and the vehicle 20. Information processing is carried out due to the CPU 11 reading-out a computer program from the ROM 12 or the storage 14, and expanding and executing the computer program in the RAM 13, or due to the CPU 21A reading-out a computer program stored in the ROM 21B, and expanding and executing the computer program in the RAM 21C. The sequence drawing illustrated in FIG. 5 illustrates the flow of engine starting processing of the vehicle 20 that is executed by the information processing device 10 and the vehicle 20 at the time when the vehicle 20 receives a start request from the information processing device 10 that functions as a digital key. In the sequence drawing illustrated in FIG. 5, the communication between the information processing device 10 and the vehicle 20 is wireless communication by BLE.

First, the engine switch of the vehicle 20 is operated by a user who is within the cabin of the vehicle, and an engine start instruction is given. In accordance with the engine start instruction, in step S101, communication by BLE is carried out between the information processing device 10 of the user and the vehicle 20.

In step S102, the vehicle 20 that has received the engine start instruction from the user judges whether or not there is trouble with the antenna 29A. In detail, the vehicle 20 judges that there is trouble with the antenna 29A due to replies from the antenna 29A to the ECU 21 being interrupted a predetermined number of times.

If, as a result of the judgment of step S102, it is judged that there is trouble with the antenna 29A (step S102: Yes), next, in step S103, the vehicle 20 transitions to an emergency start mode. The emergency start mode is a mode in which the vehicle 20 is started without using the strength of the radio waves received by the antenna 29A.

When the vehicle 20 transitions to the emergency start mode, next, in step S104, the vehicle 20 judges whether or not the strength of the radio waves received by the antennas 29B is greater than or equal to a predetermined value. If, as a result of the judgment of step S104, the strength of the radio waves received by the antennas 29B is greater than or equal to a predetermined value (step S104: Yes), next, in step 105, the vehicle 20 instructs requesting of emergency starting at the information processing device 10. The requesting of emergency starting at the information processing device 10 is carried out by requesting user authentication at the information processing device 10. On the other hand, if, as a result of the judgment of step S104, the strength of the radio waves received by the antennas 29B is not greater than or equal to a predetermined value (step S104: No), next, the vehicle 20 considers that the information processing device 10 does not exist in a vicinity of the vehicle 20, and ends the series of processings.

Figure 6:
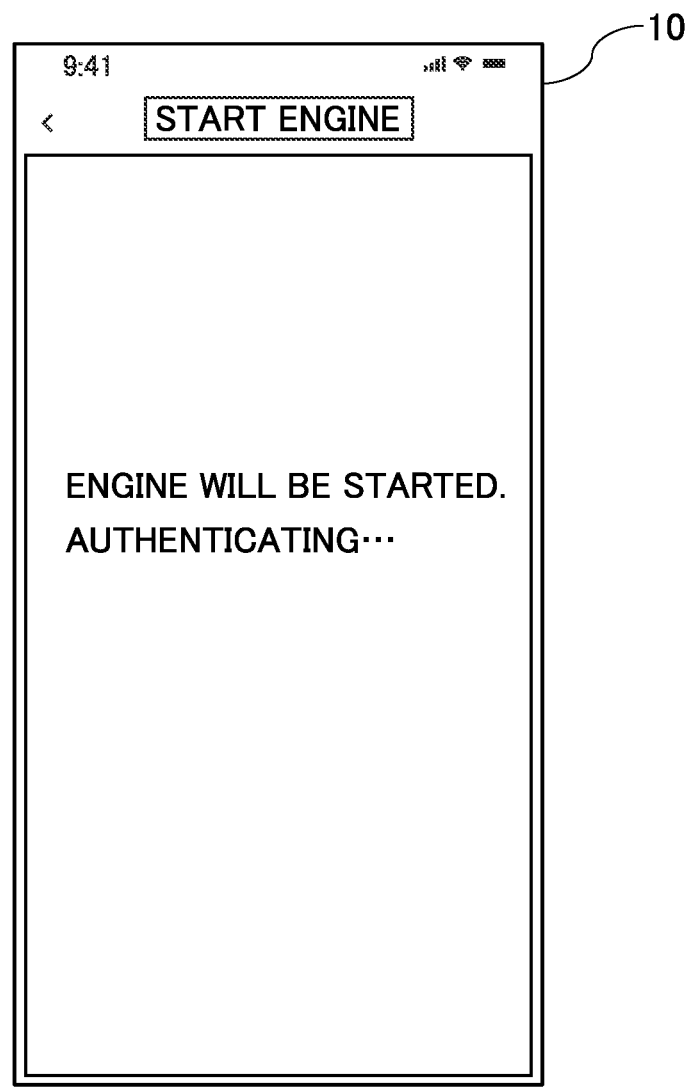
FIG. 6 is a drawing illustrating an example of a user interface.

In step S106, the information processing device 10, which receives an instruction from the vehicle 20 to request emergency starting, requests user authentication by a predetermined authentication method. FIG. 6 is a drawing illustrating an example of a user interface that the information processing device 10 displays on the display portion 16. Illustrated in FIG. 6 is an example of a user interface that the information processing device 10 displays on the display portion 16 in a state in which the user is carrying out user authentication at the information processing device 10.

Following step S106, in step S107, the information processing device 10 judges whether or not user authentication has succeeded. If, as a result of the judgment of step S107, it is judged that the user authentication has not been successful (step S107: No), the information processing device 10 ends the series of processings. If it is judged that the user authentication has not been successful, the information processing device 10 may display, on the display portion 16, a message to the effect that the user authentication was not successful. On the other hand, if, as a result of the judgment of step S107, it is judged that the user authentication was successful (step S107: Yes), next, in step S108, the information processing device 10 transmits information expressing that the user authentication has succeeded to the vehicle 20.

In next step S109, the vehicle 20, which receives information to the effect that the user authentication has been successful from the information processing device 10, confirms that that the user authentication was successful at the information processing device 10. When it is confirmed that the user authentication was successful at the information processing device 10, next, in step S110, for a predetermined time, the vehicle 20 permits starting of the engine. This predetermined time is made to be, for example, around 30 seconds. Further, the vehicle 20 may change the aforementioned predetermined time in accordance with the authentication method that is used at the information processing device 10. For example, the vehicle 20 may make the time, in a case in which biometric authentication is used as the authentication method at the information processing device 10, longer than the time in a case in which passcode authentication or pattern authentication is used as the authentication method at the information processing device 10.

At the vehicle 20, when starting of the engine is permitted for a predetermined time, and the engine switch of the vehicle 20 is operated by a user who is within the cabin of the vehicle, an engine start instruction is given again. In step S111, communication in accordance with BLE is carried out between the information processing device 10 of the user and the vehicle 20, in accordance with the engine start instruction. In step S112, the vehicle 20 judges whether or not an engine start instruction from the user has been given within the aforementioned predetermined time. In a case in which it is judged that an engine start instruction has been given within the aforementioned predetermined time (step S112: Yes), next, in step S113, the vehicle 20 starts the engine on the basis of the start instruction. On the other hand, in a case in which it is judged that an engine start instruction has not been given within the aforementioned predetermined time (step S112: No), next, the vehicle 20 ends the series of processings without starting the engine.

Figure 7:
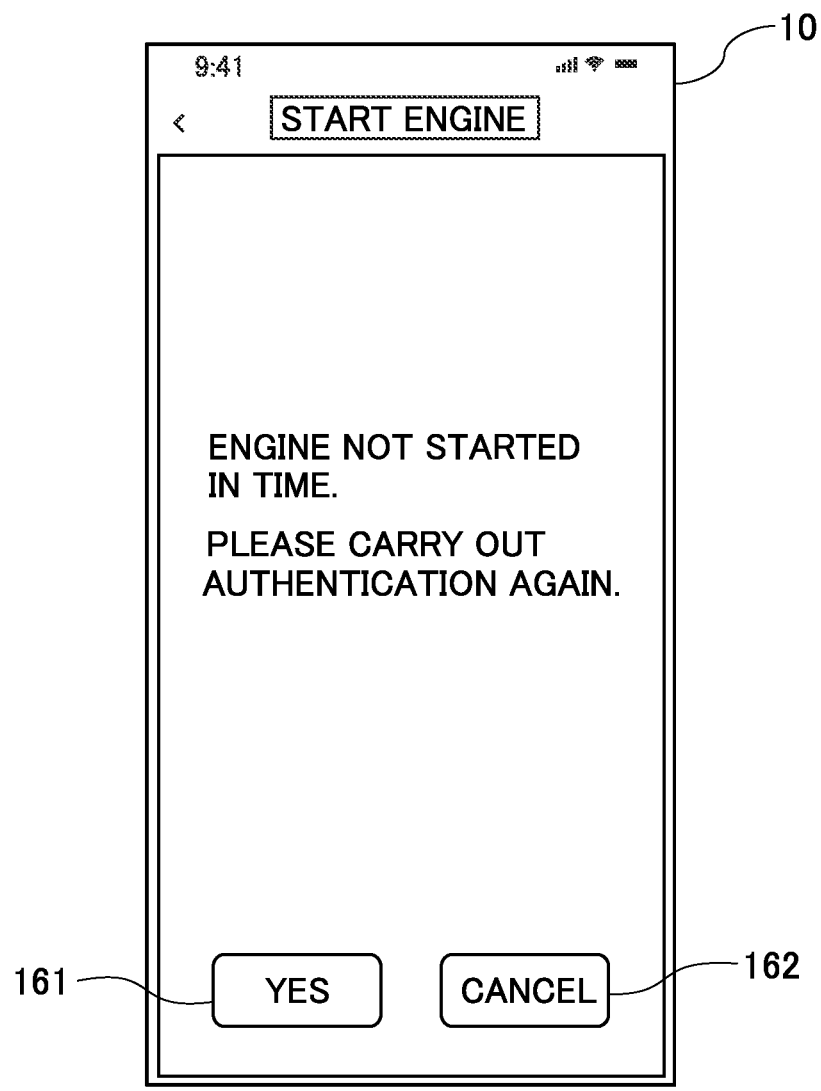
FIG. 7 is a drawing illustrating an example of a user interface.

In a case in which it is judged that an engine start instruction has not been given within the aforementioned predetermined time, the vehicle 20 may transmit, to the information processing device 10, information to the effect that the engine could not be started. Further, in a case in which the engine of the vehicle 20 cannot be started, the information processing device 10 may ask the user for user authentication again. FIG. 7 is a drawing illustrating an example of a user interface that the information processing device 10 displays on the display portion 16. Illustrated in FIG. 7 is an example of a user interface that is displayed on the display portion 16 in order to ask the user for user authentication again, in a case in which the engine of the vehicle 20 cannot be started. If the user selects button 161, the information processing device 10 executes user authentication processing again. If the user selects button 162, the information processing device 10 does not request user authentication.

Note that, if, as a result of the judgment of step S102, it is judged that there is no trouble with the antenna 29A (step S102: No), next, in step S114, the vehicle 20 judges whether or not the information processing device 10 is within an engine start area. The engine start area is, for example, the cabin of the vehicle 20.

If, as a result of the judgment of step S114, it is judged that the information processing device 10 is within the engine start area (step S114: Yes), in step S113, the vehicle 20 starts the engine on the basis of the start instruction. On the other hand, if, as a result of the judgment of step S114, it is judged that the information processing device 10 is not within the engine start area (step S114: No), the vehicle 20 ends the series of processings without starting the engine.

Due to the vehicle 20 executing the series of processings, even in a case in which it cannot be judged whether or not the information processing device 10 is within the engine start area due to a reason such as there is trouble with the antenna 29A or the like, the engine can be started on the basis of the results of user authentication carried out at the information processing device 10.

The above embodiment describes a case in which the vehicle 20 is a vehicle in which the engine is operated and driven by using gasoline for power. However, the present disclosure is not limited to this example. The vehicle 20 may be an electric vehicle such as an HEV (Hybrid Electric Vehicle), a PHEV (Plug-in Hybrid Electric Vehicle), an FCEV (Fuel Cell Electric Vehicle), a BEV (Battery Electric Vehicle), or the like.

Note that any of various types of processors other than a CPU may execute the starting processing that is executed due to the CPU reading software (a program) in the above-described respective embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the information processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above-described respective embodiments describe forms in which the starting processing program is stored in advance (is installed) in the ROM or the storage, but the present disclosure is not limited to this. The program may be provided in a form of being recorded on a non-transitory recording medium such as a CD-ROM (Compact Disk Read Only Memory), a DVD-ROM (Digital Versatile Disk Read Only Memory), a USB (Universal Serial Bus) memory, or the like. Further, the program may in a form of being downloaded from an external device over a network.

An object of the present disclosure is to provide a vehicle, a judging method, and a non-transitory, computer-readable recording medium on which a computer program is recorded which make it possible to start a vehicle using a digital key even in a case in which it cannot be confirmed whether or not the digital key exists within the vehicle.

A first aspect of the disclosure is a vehicle which includes a memory, and a processor coupled to the memory. The processor is configured to determine whether or not a communication interface is malfunctioning, the communication interface being configured to perform communication for confirming that a device, which holds a digital key for activation, is inside a vehicle cabin, and in a case in which it is determined that the communication interface is malfunctioning, perform processing that enables activation based on a result of authentication of the device.

In accordance with the first aspect of the present disclosure, even in a case in which it cannot be confirmed whether or not a digital key exists within the vehicle, starting of the vehicle by using the digital key is possible by using the results of authentication carried out at the device holding the digital key.

A second aspect of the disclosure is a vehicle of the first aspect, wherein the processor is configured to, in a case in which it is determined that the communication interface is malfunctioning, perform processing that enables activation only during a predetermined time based on the result of the authentication of the device.

In accordance with the second aspect of the present disclosure, in a case in which it cannot be confirmed whether or not a digital key exists within the vehicle, starting of the vehicle by using the digital key becomes possible after improving the security to a higher level than in a case in which it can be confirmed whether or not a digital key exists within the vehicle.

A third aspect of the disclosure is a vehicle of the second aspect, wherein the processor is configured to change the predetermined time in accordance with an authentication method used in the authentication of the device.

In accordance with the third aspect of the present disclosure, security corresponding to the authentication method can be provided by making starting possible only during a time that corresponds to the authentication method.

A fourth aspect of the disclosure is a vehicle of the first aspect, wherein the authentication of the device comprises biometric authentication.

In accordance with the fourth aspect of the present disclosure, starting of the vehicle by using a digital key is possible upon ensuring that the party, who issued the start request from the device holding the digital key, is the user of the device.

A fifth aspect of the disclosure is a vehicle of the first aspect, wherein the processor is configured to, in a case in which it is determined that the communication interface is not malfunctioning, perform processing that enables activation without using a result of authentication of the device.

In accordance with the fifth aspect of the present disclosure, in a case in which it can be confirmed whether or not the digital key exists within the vehicle, starting of the vehicle is possible while skipping authentication at the device that holds the digital key.

A sixth aspect of the disclosure is a vehicle of the first aspect, wherein the processor is configured to determine that the communication interface is malfunctioning in a case in which periodic communication with the communication interface is interrupted.

In accordance with the sixth aspect of the present disclosure, by detecting interruption of periodic communication, authentication at the device that holds the digital key for starting can be requested.

A seventh aspect of the disclosure is a judging method which includes determining, by a processor, whether or not a communication interface is malfunctioning, the communication interface being configured to perform communication for confirming that a device, which holds a digital key for activation, is inside a vehicle cabin; and in a case in which it is determined that the communication interface is malfunctioning, enabling, by the processor, activation based on a result of authentication of the device.

In accordance with the seventh aspect of the present disclosure, even in a case in which it cannot be confirmed whether or not a digital key exists within the vehicle, starting of the vehicle by using the digital key is possible by using the results of authentication carried out at the device that holds the digital key.

An eighth aspect of the disclosure is a non-transitory recording medium storing a program that is executable by a computer to perform processing. The processing includes determining whether or not a communication interface is malfunctioning, the communication interface being configured to perform communication for confirming that a device, which holds a digital key for activation, is inside a vehicle cabin, and in a case in which it is determined that the communication interface is malfunctioning, enabling activation based on a result of authentication of the device.

In accordance with the eighth aspect of the present disclosure, even in a case in which it cannot be confirmed whether or not a digital key exists within the vehicle, starting of the vehicle by using the digital key is possible by using the results of authentication carried out at the device that holds the digital key.

In accordance with the present disclosure, there can be provided a vehicle, a judging method, and a non-transitory, computer-readable recording medium which, by using results of authentication carried out at a device that functions as a digital key, make it possible to start a vehicle by using the digital key even in a case in which it cannot be confirmed whether or not the digital key exists within the vehicle.

What is claimed is:

1. A device equipped with a functionality of a digital key for starting a vehicle, the device comprising:
    a processor;
    a memory for storing instructions executable by the processor, and
    a display,
    wherein the processor is configured to:
        determine whether a communication interface of the vehicle for communicating with the device has failed;
        in response to determining that the communication interface of the vehicle has failed, cause the display to display a first screen prompting user authentication for a user of the vehicle;
        determine whether an authentication process of the authentication of the user is successful; and
        in response to determining that the authentication process is successful, cause the display to display a second screen indicating to the user of the vehicle that the vehicle can be started.

2. The device of claim 1, wherein the processor is further configured to accept a request to re-execute the authentication process for the user of the vehicle in a case in which the vehicle is not started by the user of the vehicle within a predetermined time after the authentication process is successful, and, in response to the request, cause the display to display a third screen for executing the authentication process.

3. The device of claim 1, wherein the processor is further configured to cause the display to display a first selection part that, when selected by the user, causes the authentication process to be re-executed, and a second selection part that, when selected by the user, does not execute the authentication process.

4. A display control method for a device equipped with a display and a functionality of a digital key for starting a vehicle, comprising:
    determining whether a communication interface of the vehicle for communicating with the device has failed;
    in response to determining that the communication interface of the vehicle has failed, causing the display of the device to display a first screen prompting user authentication for a user of the vehicle;
    determine whether an authentication process of the authentication of the user is successful; and
    in response to determining that the authentication process is successful, causing the display to display a second screen indicating to the user of the vehicle that the vehicle can be started.

5. A non-transitory computer-readable storage medium storing instructions that, when executed by a device equipped with a display and a functionality of a digital key for starting a vehicle, cause the device to:
    determine whether a communication interface of the vehicle for communicating with the device has failed;
    in response to determining that the communication interface of the vehicle has failed, cause the display of the device to display a first screen prompting user authentication for a user of the vehicle;
    determine whether an authentication process of the authentication of the user is successful; and
    in response to determining that the authentication process is successful, cause the display to display a second screen indicating to the user of the vehicle that the vehicle can be started.

* * * * *